United States Patent [19]
Renzetti

[11] Patent Number: 5,169,079
[45] Date of Patent: Dec. 8, 1992

[54] IN FLY TYING DEVICE AND METHODS

[76] Inventor: Andrew Renzetti, 1901 W. Strousberg Rd., Coatsville, Pa. 19320

[21] Appl. No.: 626,538

[22] Filed: Dec. 12, 1990

[51] Int. Cl.$^5$ .............................................. A01K 97/28
[52] U.S. Cl. ........................................ 242/7.19; 43/1
[58] Field of Search ................ 43/1; 242/7.01, 7.19, 242/7.21, 7.22; 289/17

[56] References Cited

U.S. PATENT DOCUMENTS

| | | | |
|---|---|---|---|
| 2,120,571 | 6/1938 | Reichenstein et al. | 29/241 |
| 2,166,585 | 7/1939 | Evans | 43/1 |
| 2,236,781 | 4/1941 | Pannier | 43/1 |
| 2,486,142 | 10/1949 | Fong | 242/149 |
| 3,060,613 | 10/1962 | Murray | 43/1 |
| 3,520,566 | 7/1970 | Bovigny | 289/17 |
| 4,169,562 | 10/1979 | Renzetti | 242/7.01 |
| 4,184,645 | 1/1980 | Starling | 242/7.01 |
| 4,189,111 | 2/1980 | Doiron | 242/7.19 |
| 4,544,145 | 10/1985 | Norlander | 242/7.15 |

Primary Examiner—Katherine Matecki
Attorney, Agent, or Firm—Eugene E. Renz, Jr.

[57] ABSTRACT

A device for rotating the shank of a fishhook on its own axis, comprising a support for affixing the device to a surface and having a mandrel mounted on the support for rotation about an axis. A clutch is mounted on the mandrel and is rotatable about the axis in one direction to cause the mandrel to rotate therewith, and is rotatable in the opposite direction without said mandrel rotating therewith. Clamping jaws are provided for gripping the fishhook to position its shank. A portion of the mandrel has a shaft portion connected by a hinge for adjusting the angle of the jaws with respect to the axis to permit alignment of the shank of the hook with the axis of the mandrel.

9 Claims, 3 Drawing Sheets

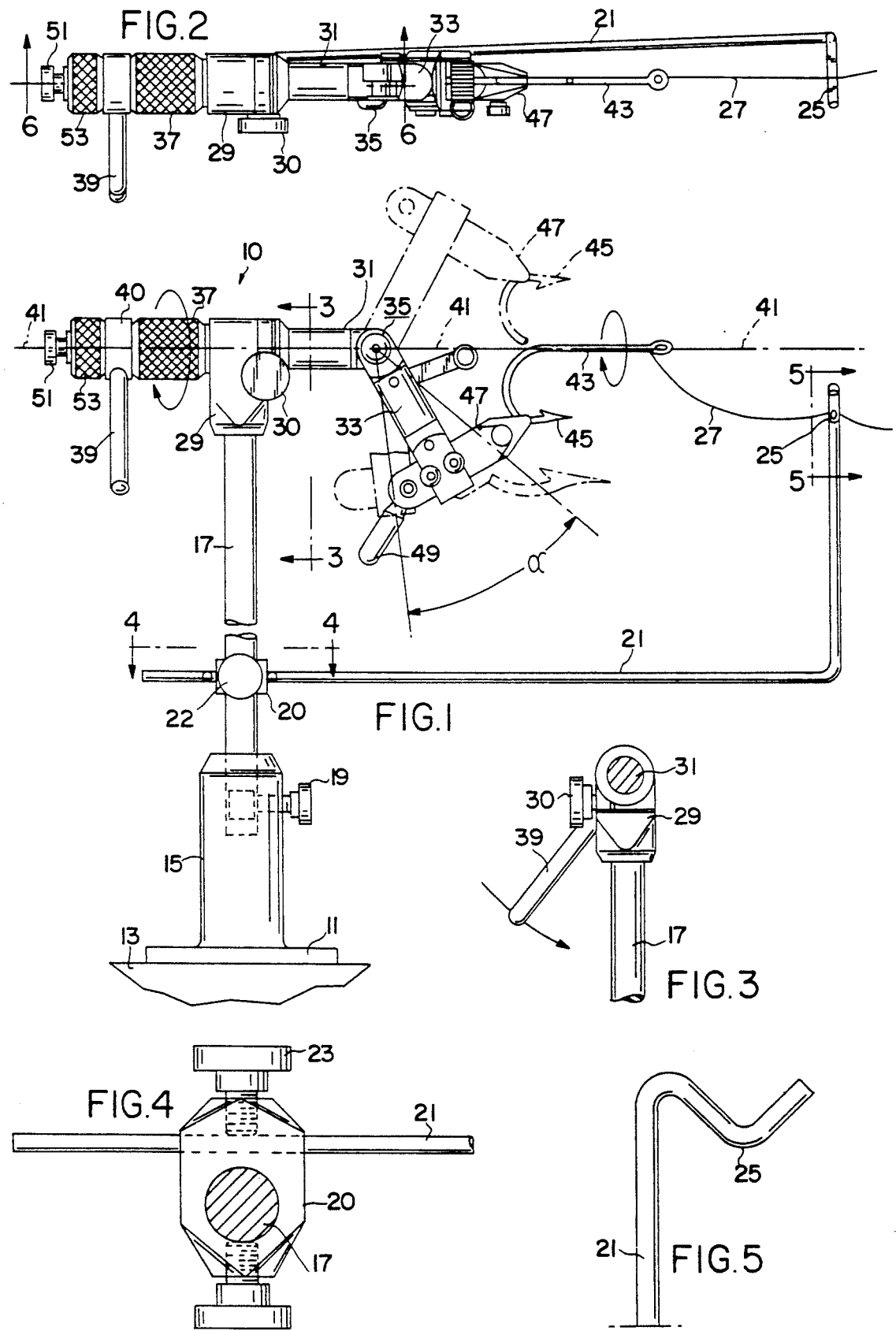

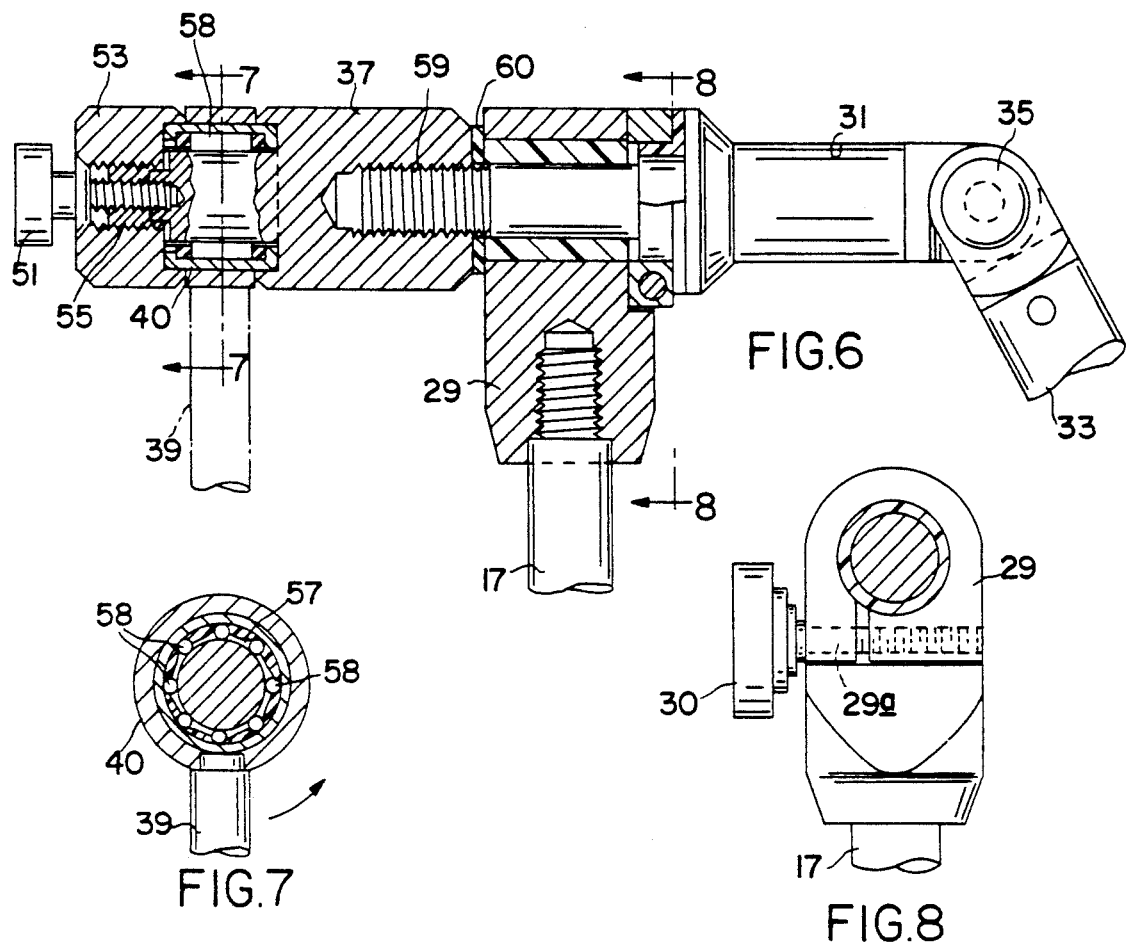
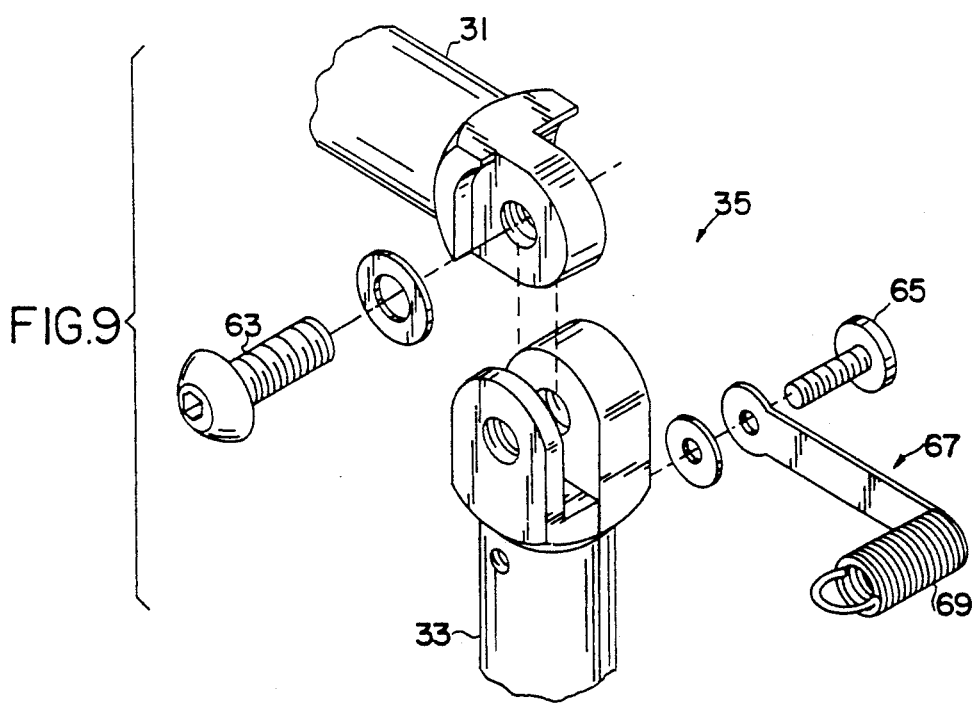

IN FLY TYING DEVICE AND METHODS

FIELD OF THE INVENTION

This invention relates generally to holding devices for fishhooks and the like. More particularly, the invention relates to devices for holding a fishhook or other similar object while various materials are tied or fastened on the shank of the fishhook as it is rotated, to make artificial flies, insects and lures.

BACKGROUND OF THE INVENTION

This invention deals with improvements upon a fly tying device disclosed in Renzetti U.S. Pat. No. 4,169,562, and also relates to other applications requiring such devices. Various clamping, support and holding devices for facilitating the tying of flies, insects or lures onto fish hooks have been disclosed in the prior art. Patents of secondary interest to the Renzetti U.S. Pat. No. 4,169,562 are Reichenstein et al U.S. Pat. No. 2,120,571, Evans U.S. Pat. No. 2,166,585, Pannier U.S. Pat. No. 2,236,781, Fong U.S. Pat. No. 2,486,142 and Murray U.S. Pat. No. 3,060,613.

Renzetti U.S. Pat. No. 4,169,562, entitled FLY TYING DEVICE, includes a rotary shaft bent at a fixed angle. The shaft is rotatable about its longitudinal axis, and is driven by a one-way clutch for rotating the shaft about the longitudinal axis in one direction. A variable drag mechanism is included with an adjusting ring for inducing variable drag and for holding the shaft at any rotational position.

Also disclosed is a clamping device, including a pair of jaws mounted on the end of the rotary shaft at a fixed compound angle to the axis of the shaft. The free end of the jaws terminate immediately adjacent to the longitudinal axis of the rotary shaft. When a fishhook is held in the jaws, the shank is fully exposed and is coaxial with the longitudinal axis.

The shaft and clutch are mounted on a adjustable height column and a clamp base is attached to the other end of the column to secure the device to a table or other surface. A thread cradle with a thread hanger is mounted on the column and a spring clip for holding fly making components is mounted on the shaft.

Now considering the use of the device of Renzetti U.S. Pat. No. 4,169,562 in the manufacture of a fly, a fish hook is clamped in the jaws such that the shank axis is coaxial with the longitudinal axis of the rotary shaft. A thread or filament is fed over the hanger hook. A suitable fly or feather is mounted on the shank and secured by the thread as the rotary shaft is rotated by the user. The thread is wound around the shank in one direction, thus tying the fly on to the hook shank. Extra feathers may be placed and held on the spring clip until needed. As additional flies or feathers are affixed to the shank in the manner described above, the shank remains coaxial with the rotary shaft axis permitting the manufacture of a precision fly.

While the Renzetti U.S. Pat. No. 4,169,562 affords advantages over the other prior art by enabling full and unrestricted exposure of the hook, and because of the ease of manipulation and rotation, several shortcomings exist. The clamping device restricts the maximum hook size to #2/0 due to the mechanical advantage limitations of the clamping device. The fixed angle at which the clamping device is mounted on the rotary shaft requires the cumbersome and time consuming substitution of three jaw chuck sizes to accommodate a reasonable range of hook sizes. This fixed angle also further limits the sizes of hooks able to be rotated co-axially with the rotary shaft axis to below #2.

Thus, the maximum hook size actually usable by the device is a #2 hook despite the ability of the clamping device to securely grip a larger #2/0 hook size. Also, the adjusting ring on the drag mechanism provides for tedious and imprecise settings of drag and for locking of the rotary shaft. This in turn limits the precision of the flies manufactured by the device by not providing for precise filament tension while rotating the shaft.

Neither Renzetti U.S. Pat. No. 4,169,562 nor any of the prior art enables the user to work on the full practical range of hook sizes, from #32 up to #14/0, currently used in the sport of fly fishing. The alternative is to clamp the fishhook in a stationary vice and rotate the filament, a method which is far less accurate. No prior art provides a clamping means capable of securely gripping the larger hook sizes. Also, the prior art is unable to align the shank of larger hook sizes coaxially with the axis of the rotatable shaft. For example, in the Renzetti U.S. Pat. No. 4,169,562, this limitation is imposed by the fixed compound angle at which the clamping means are attached. Also, none of the prior art allows for precise variable drag to be induced on the rotatable shaft, thus limiting the ease and efficiency of the fly tying procedure, as well as the precision of the finished fly.

Accordingly, it is an object of the instant invention to provide a holding device which overcomes the disadvantages and limitations of the prior art.

Another object of the instant invention is to provide a clamping device capable of securely engaging the full practical range of hook sizes, i.e. from #32 up to #14/0.

Yet another object is to provide a device capable of rotating the hook shank co-axially about a rotary shaft axis to allow for precision fly tying for the full usable range of hook sizes currently used in the sport of fly fishing, i.e. #32 up to #14/0.

Still another object of the present invention is to provide a friction device capable of inducing precise variable drag upon the rotation of the shaft and for easily locking the shaft in any rotatable position.

Other objects will appear hereinafter.

SUMMARY OF THE INVENTION

It has now been discovered that the above and other objects of the present invention may be accomplished in the following manner. Specifically, an improved device has been provided for rotating the shank of a fishhook to permit the attachment of feathers and the like for the purpose of making artificial flies for fishing.

Specifically, a support means is provided for affixing the device to a supporting surface such as a table. Mounted on the upper end of the support means is a mandrel means which has a first axis for rotation. The mandrel has first and second ends and a middle adjustable portion.

Located on the first mandrel end is a clutch means which is rotatable about the axis of rotation in one direction to cause the mandrel means to rotate in that same axial direction. The clutch is also rotatable in the opposite direction without causing the mandrel to rotate therewith.

A clamping means is mounted at the other end of the mandrel. The clamping means includes jaws for gripping the fishhook to position the shank so that feathers and the like can be placed on the shank while it is rotated about the axis and a thread is wound around the feather to firmly attach it thereto. Each jaw is provided with a helical ramp one with a right hand ramp and the other with a left hand ramp is fitted with a cam made up of two opposing helical ramps that provide the actuating means for pivotally engaging the jaw tips against the fishhook, thereby significantly increase the mechanical advantage of the jaws. In this manner, much larger hooks can be held firmly by the jaws as the fishhook is rotated about its shank on the axis of the mandrel means.

The shank axis is centered on the axis of the mandrel by adjusting the position of the jaws as they clamp the hook portion of the fishhook. In addition, the shaft extension of the mandrel is adjustable, for adjusting the angle of the jaws with respect to the axis. In this manner, the shank can be aligned precisely on the axis of rotation so that rotation of the hook shank, by moving the mandrel will allow optimization of the application of the filament or thread. Finally, the invention includes a drag means for inducing variable drag during rotation of the mandrel and for locking the mandrel in any rotational position.

BRIEF DESCRIPTION OF THE DRAWINGS

These and other objects of the present invention and the various features and details of the operation and construction thereof are hereinafter more fully set forth with reference to the accompanying drawings, where:

FIG. 1 shows a side elevational view of the device of the instant invention shown in the process of tying a feather onto a fish hook;

FIG. 2 is a plan view of FIG. 1;

FIG. 3 is a fragmentary sectional view taken along line 3—3 of FIG. 1;

FIG. 4 is an enlarged fragmentary sectional plan view taken along line 4—4 of FIG. 1;

FIG. 5 is an enlarged fragmentary elevational view taken along line 5—5 of FIG. 1;

FIG. 6 is an enlarged fragmentary sectional elevational view taken along line 6—6 of FIG. 2;

FIG. 7 is a semi-schematic fragmentary sectional view taken along line 7—7 of FIG. 6;

FIG. 8 is a fragmentary sectional elevational view taken along line 8—8 of FIG. 6;

FIG. 9 is an enlarged exploded view of the rotary shaft hinge assembly and the feather or thread holder assembly;

DETAILED DESCRIPTION OF THE PREFERRED EMBODIMENT

Figure 10:
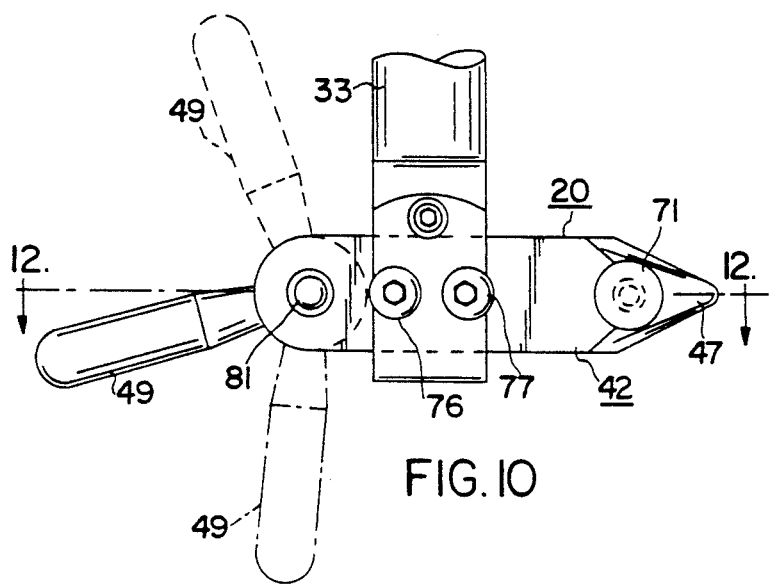
FIG. 10 is an enlarged fragmentary side elevational view of the cam actuated clamping jaw assembly and supporting structure.

The device of the present invention, shown generally by the reference numeral 10 in FIG. 1, includes a base 11 which is mounted to a table 13 so that the vertical support 15 is stable and fully capable of supporting the entire device.

An adjustable height beam 17 extends up from the vertical support 15 and is mounted therein by a clamp screw 19. Clamp screw 19 can be easily loosened by hand, and the device can be stored when not in use.

An adjustable thread cradle 21 is attached to the vertical beam 17 by mounting block 20 and clamp screw 22. Clamp screw 22 can be loosened to adjust the relative height of the thread cradle 21. Similarly, clamp screw 23 positions the thread cradle 21 in the mounting block 20 to adjust the location of hanger 25 on the other end of thread cradle 21.

As can be seen in FIG. 2, the thread cradle 21 is at a slight angle with respect to the axis of the device and the shank 43 itself so that filament 27 can be aligned as it passes over hanger 25 and onto shank 43.

A support head 29 is mounted at the top of beam 17, which head 29 supports the device of the present invention. Clamp screw 30 is mounted in support head 29 to vary the tension on mandrel 31. Mandrel 31 extends horizontally through the support head 29. At one end is a lower shaft extension 33 which is flexibly mounted by an adjustable joint 35. Extending through the support head 29 in the other direction on mandrel 31 is a shaft 37 which includes a handle 39 and clutch 40 for rotation about axis 41. The mandrel 31 is aligned on axis 41.

Also aligned on axis 41 is the shank 43 of a fishhook 45. The fishhook 45 is held in clamping jaws 47 at the outer terminal end of lower shaft extension 33. A cam actuating handle 49 closes jaws 47 on fishhook 45, thereby holding the hook 45 in place.

Rotation of handle 39 in the direction shown by the arrow surrounding shaft 37 causes the fishhook 45 to rotate about axis 41. Clamp screw 51 can be disengaged and annular threaded sleeve 53 removed so that handle 39 and clutch 40 can be adjusted or reversed. Clutch 40, as will be described herein below, permits rotation of the shaft 37, and the mandrel 31 to rotate the fishhook shank 43 about axis 41. Movement of handle 39 in the reverse direction does not impart rotational movement to the mandrel 31 because of clutch 40.

Turning now to FIG. 6, the precise assembly of the device of this invention is shown. Shaft 17 is threaded into the support head 29 to provide a sturdy support for the head 29. Mandrel 31 passes through the support head 29 and terminates in a threaded shaft 59 which joins shaft 37 to the mandrel 31. Clutch 40 fits over a portion of shaft 37. On the other side of clutch 40 is an annular threaded sleeve 53 which is held in place by clamp screw 51. Both clamp screw 51 and annular threaded sleeve 53 fit onto a bi-threaded shaft 55 to secure the clutch 40 onto shaft 37.

Clutch 40 includes a series of wedges 57 and rollers 58 which function to permit rotation of the handle 39 in the direction shown by the arrow in FIG. 7. Reversal of the movement is prevented by the locking of the rollers 58 in the reverse side of wedges 57. Thus, the device can be turned easily with one hand by rotating the handle 39 in the direction of rotation. The other hand is then free to properly align the filament 27 which is being held by hanger 25 as previously described.

Rotation of handle 39 causes shaft 37 to rotate, which in turn imparts rotation to the mandrel 31 because they are connected by threaded shaft 59. Washer 60 assists in the rotation of shaft 37 against the stationary housing, or support head 29. Housing 29 includes a clamp screw 30 which serves to tighten or loosen the tension between the main portion 29 and the bifurcated portion 29a, shown in FIG. 8. By tightening the clamp screw 30, appropriate tension can be placed on mandrel 31 to allow free rotation, a precise drag setting or to lock the shaft in any position of rotation.

Extending down from the mandrel 31 at knuckle 35 is the shaft extension 33. Knuckle 35 is attached via bolt 63 in a conventional manner. Similarly, the bolt 65 attaches an extender 67, having spring 69 mounted thereon, to a point just below the knuckle 35 of shaft extension 33. The spring 69 serves to hold feathers and other light objects which are to be attached to the fishhook 45 during rotation of the shank 43 and winding of the filament 27 as previously described.

Figure 11:
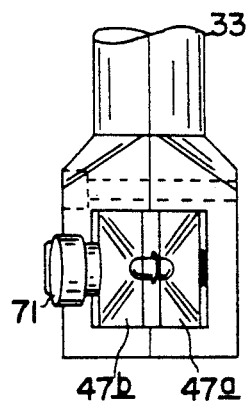
FIG. 11 is a fragmentary end elevational view taken along line 11—11 of FIG. 10.
Figure 12:
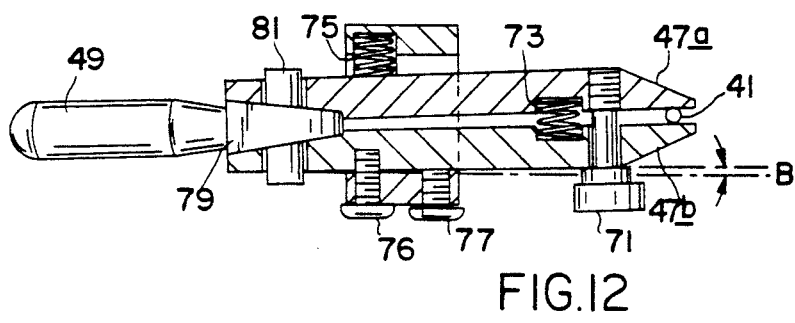
FIG. 12 is a sectional plan view taken along line 12—12 of FIG. 10.

At the bottom end of shaft extension 33 is a clamp means 20 shown in FIG. 10, which includes clamping jaws 47 and a cam actuating handle 49. As shown in FIGS. 10, 11, and 12, jaws 47a and 47b to hold a hook therebetween. The jaws 47 are kept open by spring 73 until the hook has been placed between the jaws, after which adjusting screw 71 is tightened until the jaws just touch the hook. The jaws are now set to lock the hook.

Figure 13:
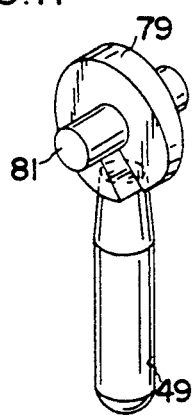
FIG. 13 is an enlarged perspective view of the actuating cam.

The invention is provided with a cam actuated device. Specifically, as shown in FIGS. 12 and 13, the spring 75 and screws 76 and 77 hold jaws 47a and 47b in a certain position. Once the hook has been placed between the jaws, handle 49 is turned so that cam surface 79 pivots about shaft 81 and is wedged between the back end of the two jaws 47a and 47b. The mechanical advantage from handle 49 and the cam surface 79 provides a much stronger grip on the hook. For the first time, relatively large hooks can be firmly held during all of the processing, without concern that the filament 27 or other forces will cause the shank of the hook to deviate from the axis 41.

Figure 14:
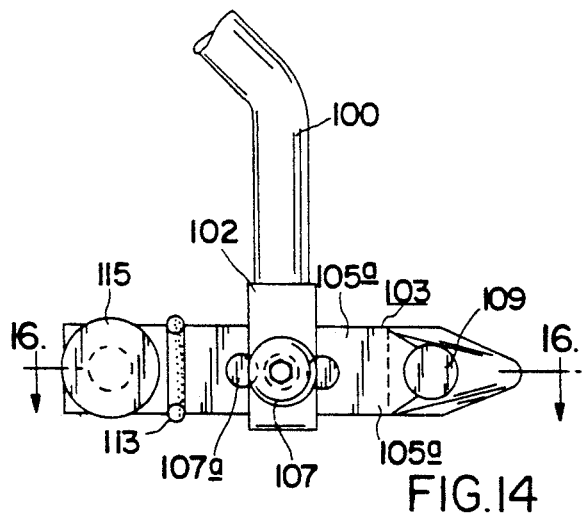
FIG. 14 is fragmentary side elevational view of the chuck clamping jaw assembly and supporting structure.
Figure 15:
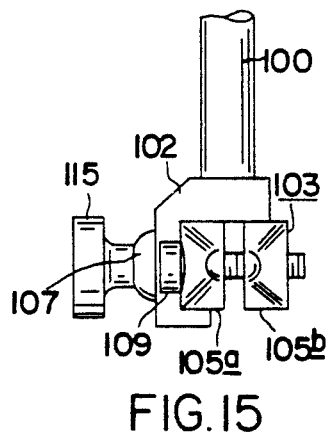
FIG. 15 is a fragmentary end elevational view taken along line 15—15 of FIG. 14.
Figure 16:
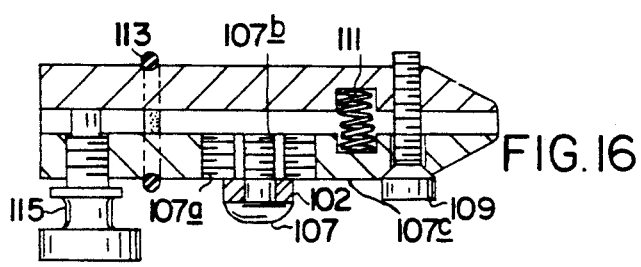
FIG. 16 is a sectional plan view taken along line 16—16 of FIG. 14.

In another embodiment of the present invention, it has been found possible to modify the prior art device described in the Renzetti U.S. Pat. No. 4,169,562 in the following manner, as shown in FIGS. 14, 15 and 16. Specifically, a fixed angle mandrel 100 is suitable for attachment to the above referred prior art model. Mandrel 100 has a clamp mounting block 102 which supports clamping jaws 103 generally. These clamping jaws 103 include a fixed clamping jaw 105a and a floating clamping jaw 105b. Jaws 105a and 105b together are capable of holding large hooks which are not possible in the prior art design. Mounting screw 107 is designed to mount the mounting block 102 in three separate positions, each being defined by a mounting screw hole 107a, 107b and 107c. The prior art design does not have the size capacity for large hooks and it does not have the inherent strength necessary to hold the jaws during the fly tying procedures.

The diameter of the hook will vary with the size of the hook. Adjustment for this variation and size is made by hook diameter adjustment screw 109 and spreader spring 111. Rubber O-ring 113 maintains a slight tension on the jaws 105a and 105b, but this tension from O-ring 113 is easily overcome by clamping force adjustment screw 115 which forces the jaws to clamp the hook as previously described.

While particular embodiments of the present invention have been illustrated and described herein, it is not intended to limit the invention. Changes and modifications may be made therein within the scope of the following claims.

What is claimed is:

1. A device for rotating the shank of a fishhook about its axis, comprising:
    a mandrel rotatable about a predetermined axis of rotation;
    a base which includes means for rotatably mounting said mandrel;
    a first shaft extension, and means for pivotally mounting said first shaft extension on one end of said mandrel, said first shaft extension having a shaft axis which intersects the axis of rotation of said mandrel and is repositionable relative thereto;
    clamping means mounted on an outer end of said first shaft extension and including jaws for gripping said fishhook;
    whereby said first shaft extension is selectively repositionable relative to the axis of rotation of the mandrel so that the fishhook shank axis may be aligned with the mandrel axis.

2. The device as claimed in claim 1 including clutch means rotatable about said first axis in one direction and including means for causing said mandrel to rotate therewith, and means for allowing said clutch means to rotate in an opposite direction independently of said mandrel.

3. The device of claim 2 wherein said mandrel includes means for removably mounting said clutch means and allowing reversal of the clutch means on said mandrel, whereby the direction of rotation of said mandrel can be reversed.

4. The device of claim 1 wherein said clamping means includes cam means for actuating said jaws to engage said fishhook.

5. The device of claim 4 wherein said jaws further include biasing means for separating said jaws.

6. The device of claim 1 wherein said base includes drag means for inducing drag on said mandrel during rotation of said mandrel, and means for varying said drag.

7. The device of claim 6 wherein said drag means further includes means for locking said mandrel in any rotational position.

8. The device claimed in claim 1 wherein said clamping means comprises a rotatable cam having a spiral cam surface which engages confronting faces of the jaws at one end thereof, the confronting faces of the jaws comprising complementary spiral faces, the clamping means further comprising means for biasing the jaws toward one another to engage said cam, whereby rotation of said cam in one direction causes the other ends of the jaws to close and rotation of the cam element in the opposite direction causing the other ends to open.

9. A device claimed in claim 1 including drag means on the base, comprising a split collar surrounding the mandrel and means for adjusting the clamping engagement of the collar on the mandrel thereby providing a means for exerting a drag force against rotation of the mandrel which is easily adjustable during use of the device.

* * * * *